United States Patent [19]

Sinden et al.

[11] Patent Number: 5,537,489
[45] Date of Patent: Jul. 16, 1996

[54] METHOD OF NORMALIZING HANDWRITTEN SYMBOLS

[75] Inventors: Frank W. Sinden, Princeton; Gordon T. Wilfong, Gillette, both of N.J.

[73] Assignee: AT&T Corp., Murray Hill, N.J.

[21] Appl. No.: 154,150

[22] Filed: Nov. 18, 1993

Related U.S. Application Data

[63] Continuation of Ser. No. 922,583, Jul. 29, 1992, abandoned.

[51] Int. Cl.$^6$ ........................................ G06K 9/36
[52] U.S. Cl. ..................... 382/187; 382/296; 382/298
[58] Field of Search .................... 382/13, 46, 47, 382/23, 30, 44, 45, 186, 187, 296, 119, 201, 290, 298

[56] References Cited

U.S. PATENT DOCUMENTS

| | | | |
|---|---|---|---|
| 3,614,736 | 10/1971 | McLaughlin et al. | 382/30 |
| 3,636,513 | 1/1972 | Tisdale | 382/204 |
| 4,155,072 | 5/1979 | Kawa | 382/296 |
| 4,284,975 | 8/1981 | Odaka | 382/13 |
| 4,646,351 | 2/1987 | Asbo et al. | 382/13 |
| 4,759,075 | 7/1988 | Lipkie et al. | 382/296 |
| 5,077,811 | 12/1991 | Onda | 382/290 |
| 5,287,415 | 2/1994 | Chefalas et al. | 382/13 |
| 5,325,447 | 6/1994 | Vogt, III | 382/186 |

OTHER PUBLICATIONS

Agui et al. "Recognition of Handwritten Katakana in a Frame Using Moment Invariants Based on Neural Network" 1991 IEEE Int. Joint Conf. on Neural Networks, vol. 3, Nov. 1991, pp. 659–664.

Lee et al. "Tracing and Representation of Human Line Drawings" 1989 IEEE Int. Conf. on Systems, Man and Cybernetics, vol. 3, Nov. 1989, pp. 1055–1061.

Plamondon, R. and Lorette, G., "Automatic Verification and Writer Identification—The State of Art", Pattern Recognition, vol. 22, No. 2, pp. 107–131, (1989).

*Primary Examiner*—Joseph Mancusco
*Assistant Examiner*—Jon Chang
*Attorney, Agent, or Firm*—Geoffrey D. Green

[57] ABSTRACT

A handwritten test symbol, such as an alphabetic character, a word or a signature, written on a digitizing tablet is normalized by comparison with a model symbol to determine the transformation necessary to best fit the test symbol to the model symbol. Such transformation is then applied to normalize the test symbol. Shape information in the test symbol is preserved during such normalization. In accordance with one aspect of the invention, the model symbol is a line segment. In accordance with another aspect of the invention, the model symbol is an example of the symbol being normalized. Such normalization can be used as a preprocessing step in applications such as character recognition, text recognition or signature verification.

9 Claims, 2 Drawing Sheets

TO RECOGNITION PROCESS

METHOD OF NORMALIZING HANDWRITTEN SYMBOLS

This application is a continuation of application Ser. No. 07/922,583, filed on Jul. 29, 1992 now abandoned.

TECHNICAL FIELD

This invention relates to symbol recognition and more particularly to normalization of symbols handwritten on a digital tablet for use by recognition or verification means.

BACKGROUND OF THE INVENTION

In systems responsive to handwritten symbols, such as signature verification systems or character recognition systems, it is often desirable to "normalize" an entered symbol before the symbol is submitted to subsequent processing steps. Normalization may include rotations, changes in size and/or translations to different positions. For example, in a signature verification system in which a signature to be verified is compared with one or more stored model signatures, or where parameters representing salient characteristics of a signature to be verified are compared with corresponding parameters derived from one or more model signatures, it is typically necessary to normalize both the model signatures and the signatures to be verified to remove differences unrelated to shape.

In some methods of recognizing handwritten symbols, a separate normalizing step is not necessary. We disclose such a method in our copending application Ser. No. 07/857,198 filed Mar. 24, 1992. In accordance with the invention described in such application, an unknown symbol handwritten on a digitizing tablet is compared with symbols in a predefined "alphabet" or library of model symbols and the closest match chosen. Recognition is independent of the size, position or orientation of the symbols. The comparison involves calculating a correlation factor from scalar products of vectors representing coordinate samples from the unknown symbol and the model symbols. In such method, the normalizing function is inherent in the comparison procedure.

However, for those applications where normalization is required, such as some methods of symbol recognition and/or signature verification, it is desirable to have a fast, straightforward method of performing such normalization.

SUMMARY OF THE INVENTION

A handwritten test symbol, such as an alphabetic character, a word or a signature, written on a digitizing tablet is normalized by comparison with a model symbol to determine the transformation necessary to best fit the test symbol to the model symbol. Such transformation is then applied to normalize the test symbol. Shape information in the test symbol is preserved during such normalization. In accordance with one aspect of the invention, the model symbol is a line segment. In accordance with another aspect of the invention, the model symbol is an example of the symbol being normalized. Such normalization can be used as a preprocessing step in applications such as character recognition, text recognition or signature verification.

DETAILED DESCRIPTION

The invention will be described principally as a method for normalizing signatures for on-line verification; however, it will be clear to those skilled in the art that the method of the invention can be used for normalizing handwritten symbols characters or cursive script for other applications, such as character recognition. It will also be clear to skilled practitioners that the method of the invention can be used for normalization of any symbols represented as sets of coordinate samples.

In general, on-line signature verification proceeds as follows. A subject writes a signature on a digitizing tablet and the coordinates of the tip of the pen (and possibly pen pressure on the tablet) are recorded at sampled times. The resulting data is compared in a processor with stored information about the subject's signature. In some systems, the stored information is a sample of the signature itself. In others, such information is a set of measures, each one representing some feature of the subject's typical signature. Some measures are dynamic; for example, average speed; others are static, such as shape characteristics. One type of signature verification system is described in copending application Ser. No. 07/732,558 filed Jul. 19, 1991. Others are described in the article by Plamondon et al. entitled "Automatic Signature Verification and Writer Identification—The State of the Art" published in Pattern Recognition, Vol. 22, No. 2 pp. 107–131, 1989.

The normalization method of the present invention is based on the recognition method disclosed in application Ser. No. 07/857,198 referred to above. In such recognition method, normalization of the unknown symbol to best fit the model is implicit in the computation of the correlation between unknown and model symbols. However, the normalization necessary is never explicitly determined. To modify such recognition method for use solely as a normalizing procedure, the normalization step must be performed separately. The similarity determination can then be made by any suitable procedure.

One method of normalizing a signature to be verified (the test signature) in accordance with one embodiment of the present invention is to translate, rotate and change the size of the test signature to obtain the best fit with a model of the signature being verified. However, it may not be practical to store models of all possible signatures that the system may be called upon to handle. An alternative, in accordance with another embodiment of the invention, is to normalize the test signature using a neutral symbol, such as a horizontal line segment, for the model symbol. Such a line segment can be directed from left to right, as a signature is usually written.

Figure 1:
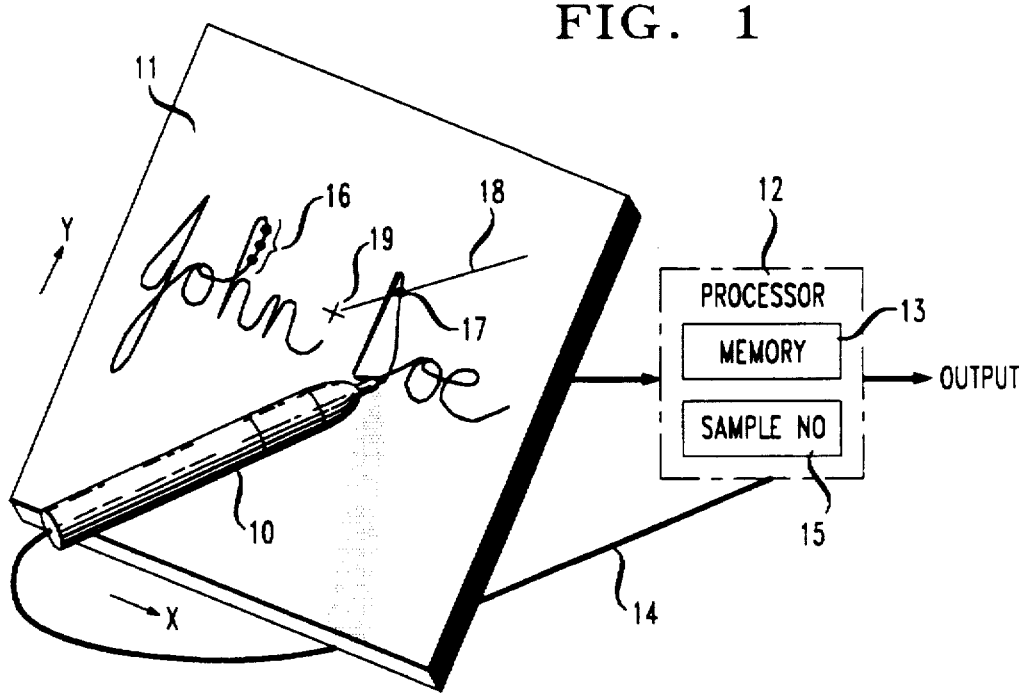
FIG. 1 is a block diagram of a system for performing the invention.

FIG. 1 is a block diagram of a system for performing the method of the invention. Symbols are written with stylus or pen 10 on digitizing tablet or pad 11. Pad 11 is capable of sensing the position of the tip of pen 10 on the surface of pad 11, and typically will also be able to sense the presence of pen 10 on the pad.

Pad 11 is connected to processor 12. With some types of pads, pen 10 may also be connected to processor 12 as indicated by lead 17. Representations of symbols entered are stored in memory 13 as ordered sets of x–y coordinates. Register 15 is used for storing the number of samples taken during entry of a signature. As will be clear to a skilled practitioner, the actions to be described would typically be controlled by a computer program stored in memory in processor 12.

In operation, as a signature is written on pad 11, processor 12 collects a time sequence of samples, for example, as shown at 16, of the position of the tip of pen 10 on the surface of pad 11. Each sample is a set of x–y coordinates representing the pen position at the time the sample is taken. Typically, such samples are taken at a rate of about 250 samples per second and the x–y coordinates and the position of pen 10 can be sensed with a resolution of about 0.1 mm. A signature will typically have more than 800 samples. The end of a signature can be indicated by a timeout (e.g. 2 seconds) after removal of pen 10 from pad 11, or by some other action of the person writing the signature.

It will be clear to those skilled in the art that the values of samples collected as described above will be represented by electrical signals in processor 12 and that the computer program in processor 12 will implement the various mathematical operations to be described by causing the appropriate manipulation of electrical signals by processor 12.

Figure 2:
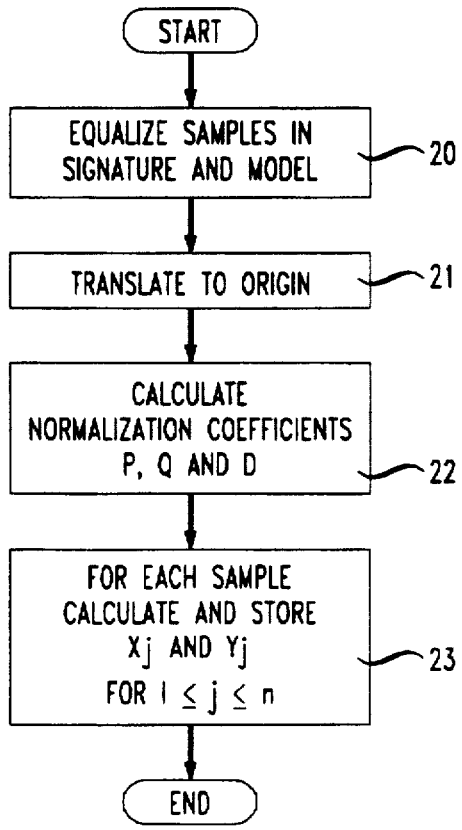
FIG. 2 is a flow chart illustrating the steps of the invention.

Referring now to FIG. 2, the various steps in the normalizing method of the invention will be described.

In step 20, the number of samples in the signature is made equal to the number of samples in the model being used. Such equalization can be accomplished by choosing a number of samples uniformly along the signature equal to the number in the model, say 800 samples, and discarding the rest. Alteratively, the number of samples in the model can be made equal to the number in the test signature in a similar way.

In step 21, the samples are translated so that the centroid, or "center of gravity," of the signature lies at the origin. To perform this translation, the centroid z is found by $$z = \left[ \frac{1}{n} \sum_{i=1}^{n} x_i, \frac{1}{n} \sum_{i=1}^{n} y_i \right] = (x_z, y_z)$$

and the translation is performed by evaluating $$\bar{x}_i = x_i - x_z \text{ and } \bar{y}_i = y_i - y_z$$

for $1 < i < n$.

Next, as indicated by block 22, the normalization coefficients P, Q and D are calculated as follows:

$$P = \sum_{i=1}^{n} \bar{x}_i a_i + \bar{y}_i b_i$$

$$Q = \sum_{i=1}^{n} \bar{x}_i b_i - \bar{y}_i a_i$$

$$D = \sqrt{(P^2 + Q^2) \sum_{i=1}^{n} (\bar{x}_i^2 + \bar{y}_i^2)}$$

where n is the number of samples, $\bar{x}_i$ and $\bar{y}_i$ are the translated sample points from the symbol entered and $a_i$ and $b_i$ the sample points for the model symbol. The $a_i$, $b_i$ pairs are defined so that the centroid of the model symbol is also at the origin.

If the model symbol is a horizontal line segment, the values for $a_i$ will be simply the values for equally-spaced points along the segment and $b_i$ will always be zero. The normalization coefficients P and Q can then be calculated as $$P = \sum_{i=1}^{n} \bar{x}_i a_i$$

$$Q = - \sum_{i=1}^{n} \bar{y}_i a_i$$

The values of $a_i$ are chosen so that the centroid of the horizontal line segment is also at the origin.

Finally, as indicated by step 23, normalized values are calculated for each sample as follows:

$$X_j = \frac{\bar{x}_j P - \bar{y}_j Q}{D}$$

$$Y_j = \frac{\bar{x}_j Q + \bar{y}_j P}{D}$$

for $1 < j < n$. These normalized x–y coordinates can be stored in processor 12 and utilized by a subsequent recognition or verification procedure. The above computations reposition the signature sample points to give the best overall match with the model sample points by minimizing the sum of the squares of the distances between corresponding sample points from the signature and the model, without altering the shape of the signature. Considering each signature sample point as a point on a ray extending from the centroid of the signature (for example, sample point 17 on ray 18 from centroid 19 in FIG. 1), such repositioning moves all the sample points along their respective rays by the same proportional amount and rotates all the sample points around the centroid through the same angle.

If two signatures or symbols are similar except for size, rotation or position on the digitizing pad, then the signatures or symbols will correspond closely after normalization as described above. Thus, the method can be used with any signature verification procedure that expects signatures to be in some fixed position, scale and orientation. Since many such verification methods rely on shape matching using the absolute data points provided by the digitizing tablet, such normalization would be useful as a preprocessing step to remove problems caused by differences in position, size and orientation of different instances of a person's signature. Also, some verifiers use such geometric features as local maximum and minimum "y" values to segment the signature. Such measurements are not robust to rotations, so the normalization method of the invention would be useful for returning the signature to "horizontal." Advantageously, the embodiment of the invention using a neutral symbol, such as a line segment, can be used to normalize sample signatures from which signature information is extracted for subsequent use by the verification system as well as signatures submitted for verification.

Figure 3:
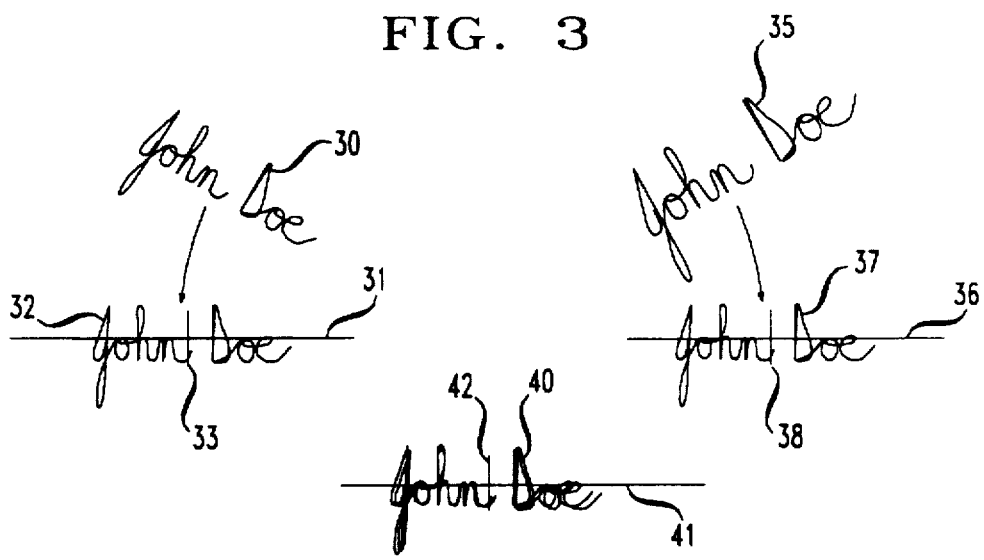
FIG. 3 is a diagram showing two examples of a signature normalized in accordance with the invention and superimposed for comparison.

FIG. 3 is a diagram showing two separate signatures normalized with respect to line segments in accordance with the invention and superimposed for comparison. Of course, such signatures and line segments are represented as ordered sets of coordinate samples in processor 12. Signature 30 is shown with orientation and size as written on pad 11. Signature 32 is signature 30 normalized with respect to line segment 32. The centroids of both signature 32 and line segment 33 are located at origin 33.

Signature 35 is written with different size, orientation and position with respect to signature 30. Signature 35 also has slight differences in shape with respect to signature 30, as would be typical for two examples of a person's signature. Signature 35 is normalized with respect to line segment 36 resulting in normalized signature 37. The origin is again indicated at 38. Signatures 32 and 37 are shown superimposed at 40, with a common horizontal line segment 41 and origin at 42. It can be seen from FIG. 3 how the method of the invention removes differences due to size, orientation and position.

As will be apparent from the above description of normalizing signatures, the normalizing method of the invention can also be used as a preprocessor in cursive script recognition systems to insure that a written word, or line of written words, is properly oriented, scaled and positioned before any recognition procedure begins.

As mentioned above, a signature can be normalized by comparing it with another example of the same person's signature instead of with a line segment. An analogous preprocessing method can be used in recognizing the other symbols, such as alphabetic characters. In a typical recognition process, an unknown character is compared with models of all characters in the alphabet and the character with the highest correlation is chosen as the one probably intended by the writer. In accordance with one aspect of the current invention, before an unknown character is compared with an alphabet character, the unknown character is normalized with respect to such alphabet character. For example, if the letters a–z are in the alphabet and a letter "f" is written, the coordinate samples for such written letter are normalized in accordance with the invention in relation to models for each of the letters of the alphabet before comparison with such letters, and the normalized versions are passed to whatever comparison method is to be used. As before, this normalizing step will remove differences due to position, scale and rotation.

Figure 4:
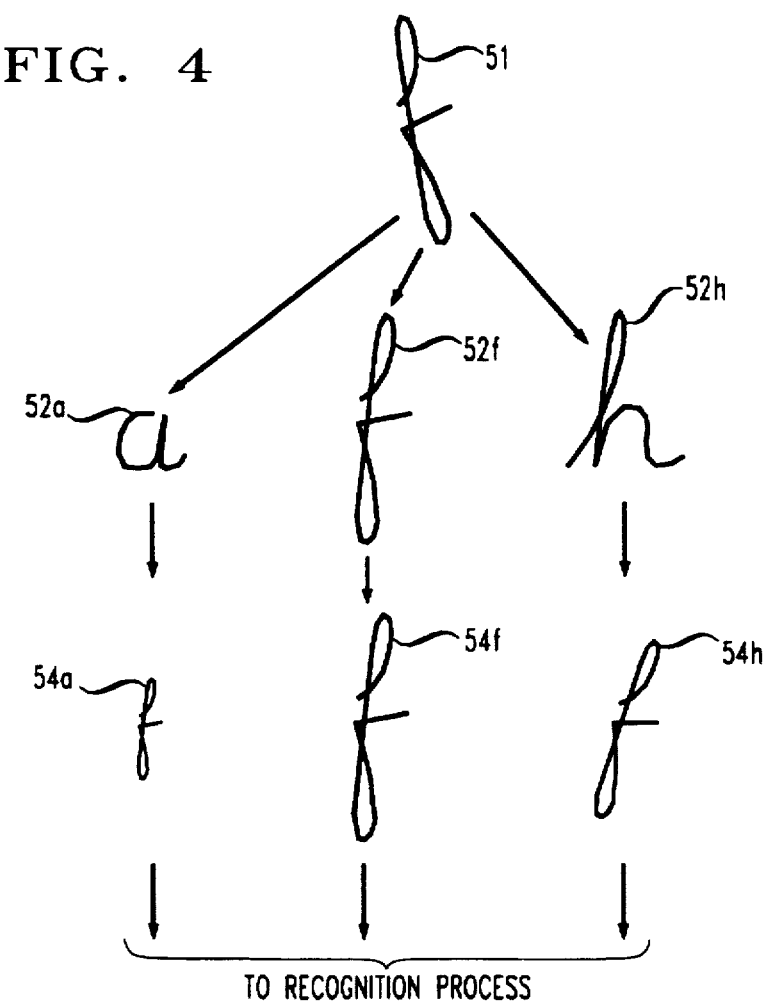
FIG. 4 is a diagram illustrating a handwritten alphabetic symbol normalized with respect to models for alphabetic symbols for use by a subsequent recognition step.

FIG. 4 is a diagram illustrating a handwritten alphabetic character being normalized with respect to models for alphabetic symbols, in accordance with the invention, before a subsequent recognition process. The letter "f" as written, shown at 51, is the character to be recognized. Three examples of model characters are shown at 52a, 52f and 52h. The letter "f" as written after being normalized in accordance with the invention with respect to the model letter "a" at 52a is shown at 54a; other normalized versions of the written letter are shown at 54f and 54h. As can be seen, the letters "f" at 54a, 54f and 54h are clear representations of the letter as written, but with differences in size and orientation resulting from the differences in the model symbols. After normalization, the set of x–y coordinates for each of the normalized versions of the letter to be recognized are then forwarded to whatever comparison or recognition process is to be used to identify the character.

In cases where a signature is being normalized with respect to a model symbol that is also a signature, or in cases where an unknown character is being normalized with respect to another character before comparison, an alternative calculation for the normalization coefficient D can be used advantageously as follows:

$$D = \sum_{i=1}^{n} (\bar{x}_i^2 + \bar{y}_i^2)$$

By using the latter calculation for D, the size of the model symbol will essentially govern the size of the normalized symbol. By using the former calculation for D, the size of the model symbol (i.e., length of the horizontal line) will have substantially less effect on the size of the normalized symbol. The former calculation for D was used for the example illustrated in FIG. 3; the latter calculation was used for the example illustrated in FIG. 4.

It is understood that other embodiments are possible that incorporate the principles of the invention and that the above disclosure is merely illustrative of such principles and is not intended to be limiting in any respect.

What is claimed is:

1. In a computer-based system for processing handwritten test symbols wherein first signals representing ordered sets of coordinate sample points are collected and stored in said computer as said test symbols are being written, a method of normalizing the scale and orientation of said test symbols in preparation for subsequent processing, which comprises the steps of:

storing second signals in said computer representing an ordered set of sample points from a model symbol, said model symbol sample points being selected so that the centroid of said model symbol lies at an origin, in said computer, for each test symbol;

equalizing the number of said first signals with the number of said second signals to equalize the number of said test symbol sample points with the number of said model symbol sample points so that each test symbol sample point corresponds to a model symbol sample point, processing said first signals to translate said test symbol sample points so that the centroid of said test symbol lies at said origin, generating third signals from said processed first signals and said second signals to represent said test symbol sample points moved radially by the same proportional amount with respect to said origin and rotated around said origin through the same angle to obtain substantially the best match between said test symbol sample points and the corresponding model symbol sample points, whereby said third signals represent sample points for a normalized version of said test symbol, said third signals being generated by minimizing the sum of the squares of the distances between said moved test symbol sample points represented by said third signals and the corresponding model symbol sample points.

2. The method of claim 1 wherein said test symbols are signatures.

3. The method of claim 2 wherein said model symbol is also a signature.

4. The method of claim 1 wherein said model symbol is a line segment.

5. The method of claim 1 wherein said test symbols are alphabetic characters.

6. The method of claim 5 in which said model symbol is also an alphabetic character.

7. The method of claim 6 in which said second signals are stored for a plurality of model symbols and said equalizing, processing and generating steps are repeated for each of said plurality of model symbols.

8. The method of claim 1 wherein said generating step comprises the steps of:

computing normalization coefficients P, Q and D as $$P = \sum_{i=1}^{n} \bar{x}_i a_i + \bar{y}_i b_i$$

$$Q = \sum_{i=1}^{n} \bar{x}_i b_i - \bar{y}_i a_i$$

$$D = \sqrt{(P^2 + Q^2) \sum_{i=1}^{n} (\bar{x}_i^2 + \bar{y}_i^2)}$$

where n is the equalized number of said first signals and said second signals, $x_i$ and $y_i$ are the values of the processed first signals, $a_i$ and $b_i$ are the values of said second signals and computing the values $X_j$ and $Y_j$ of said third signals as $$X_j = \frac{\bar{x}_j P - \bar{y}_j Q}{D}$$

$$Y_j = \frac{\bar{x}_j Q + \bar{y}_j P}{D}$$

for $1 < j < n$.

9. The method of claim 8 wherein said normalization coefficient D is calculated as $$D = \sum_{i=1}^{n} (x_i^2 + y_i^2).$$

* * * * *